Patented May 26, 1936

2,041,715

UNITED STATES PATENT OFFICE 2,041,715

CELLULOSE DERIVATIVE COMPOSITIONS

Emmette F. Izard, Elsmere, Del., assignor to E. I. du Pont de Nemours & Company, Wilmington, Del., a corporation of Delaware No Drawing. Application April 11, 1935, Serial No. 15,817. In Great Britain May 8, 1933

25 Claims. (Cl. 106—40)

This invention relates to new compositions of matter and particularly to compositions containing levulinic acid esters of alcohols, and still more particularly to cellulose organic acid ester compositions containing levulinic acid esters of ether alcohols and specifically to cellulose acetate compositions containing these esters.

This case is a continuation in part of U. S. Patent 2,004,115 issued on copending application, Serial No. 609,976, filed May 7, 1932.

This invention has as an object the preparation of new compositions containing organic acid esters of cellulose and particularly cellulose acetate, which compositions also contain a levulinic acid ester of an ether alcohol.

These objects are accomplished by the following invention wherein a levulinic acid ester of an ether alcohol is formulated into cellulose derivative compositions, and particularly cellulose acetate compositions.

In U. S. Patent 2,004,115 issued on copending application Serial No. 609,976, filed May 7, 1932, there are described numerous levulinic acid esters of ether alcohols which are of use in the process of the present invention. The preparation of these esters forms no part of this invention, but by way of illustration and not limitation, it may be stated that the esters may be prepared by any of the methods disclosed in the above case or by ester interchange between a lower alkyl ester of levulinic acid and an ether alcohol in the presence of an appropriate catalyst such as sodium alcoholates or litharge. Numerous types of ether alcohol may be used to esterify the levulinic acid including monoalkyl, cycloalkyl, aryl or aralkyl ethers of glycol, diethylene glycol, other polyethylene glycols, propylene glycol, dipropylene glycol, mono- or polyalkyl, cycloalkyl, aryl, or aralkyl ethers of glycerine, and other polyhydric alcohols, provided of course, in all cases that at least one free hydroxyl group remains in the modified ether alcohol. Polyhydric ether alcohols such as diethylene glycol, dipropylene glycol, etc., may be used and also cyclic ether alcohols such as tetrahydrofurfuryl alcohol may be employed.

In the above classes of ether alcohols, the alkyl group may be a straight chain such as methyl, ethyl, butyl, octyl, dodecyl, or octadecyl, or it may be a branch chain alkyl radical such as is contained in the alcohols obtained along with methanol in the hydrogenation of carbon oxides at elevated temperatures and pressures. Branch chain alkyloxyethanols, such as may be prepared by the action of ethylene oxide or the branch chain alcohols of at least six carbon atoms from the above hydrogenation of carbon oxides, are particularly suitable alcohols for the preparation of levulinic acid esters which are of very considerable utility in the cellulose organic acid ester compositions of the present invention and particularly in the cellulose acetate compositions. The following esters are illustrative of the large number of esters of levulinic acid which have been found useful in the cellulose organic acid ester compositions of the present invention: butoxyethyl levulinate, 2-methylpentyloxyethyl levulinate, cyclohexyloxyethyl levulinate, 2,4-dimethylhexyloxyethyl levulinate, benzyloxyethyl levulinate, phenoxyethyl levulinate, butoxyethoxyethyl levulinate, diethylene glycol dilevulinate, dibutylin levulinate, dodecyloxyethyl levulinate, butoxypropyl levulinate.

These levulinic acid esters of ether alcohols have been found to be soluble in the usual organic solvents and are compatible with cellulose derivatives, and are particularly useful with esters of cellulose with organic acids and most particularly with cellulose acetate.

Having outlined above the general principle and purposes of the invention, the following examples are given to illustrate the use of these esters in the formulation of cellulose derivative compositions:

Example 1

| | Parts |
|---|---|
| Cellulose acetate | 100 |
| 2-methylpentyloxyethyl levulinate | 25 |
| Acetone | 500 |

Example 2

| | Parts |
|---|---|
| Cellulose acetate | 100 |
| 2,4-dimethylhexyloxyethyl levulinate | 80 |
| Solvent | 500 |

Example 3

| | Parts |
|---|---|
| Cellulose acetate | 100 |
| 2-methylpentyloxyethoxyethyl levulinate | 50 |
| Pigment (including color) | 100 |
| Solvent | 400 |

The above compositions may be used as lacquers for coating metal, wood, fabrics or they may be used in the casting of thin transparent films.

Example 4

| | Parts |
|---|---|
| Cellulose acetate | 100 |
| Cyclohexyloxyethyl levulinate | 80 |

Example 5

| | Parts |
|---|---|
| Cellulose acetate | 100 |
| Diethylene glycol dilevulinate | 35 |

Example 6

| | Parts |
|---|---|
| Cellulose acetate | 100 |
| Levulinates of the mixture of branch chain alkoxyethanols | 50 |
| Filler (including color) | 200 |

The above compositions may be prepared with or without the usual volatile solvents such as acetone, alcohol or dioxan. A part of the plasticizer in the above examples may be replaced by one or more common plasticizers such as triacetin, dimethyl phthalate, acetanilide, triphenyl phosphate, dimethoxyethyl phthalate, etc.

Although cellulose acetate was used as a cellulose derivative in the above examples, it may be replaced by other cellulose esters of organic acids such as cellulose propionate, cellulose acetate propionate, cellulose acetate butyrate, cellulose butyrate, cellulose isobutyrate, cellulose acetate isobutyrate, cellulose caproate, etc.

The plasticizers may be used in varying proportions, i. e., 5, 10, 15, 20, 30, 40, 50, 70, 80, 90, 100, 150, 200, or more parts per 100 parts of cellulose acetate. The proportions indicated in the examples represent proportions which are useful in a large number of applications. Fifteen to eighty-five parts of the plasticizer per 100 of cellulose acetate includes the ordinarily useful range.

The levulinates of the ether alcohols may be employed generally as cellulose acetate plasticizers. The ether alcohol may be represented by the formulae $(RO)_yR'(OH)_x$ or $HOR^2OR^2OH$ in which R is an alkyl, cycloalkyl, aryl or aralkyl radical, R' is a polyvalent aliphatic hydrocarbon radical, the valence of which is $x+y$, $x$ is a positive number from one to three, $y$ is a positive number from one to four, and $R^2$ is a divalent hydrocarbon radical or hydrocarbon radical containing an ether group.

The preferred ether alcohols are those wherein $x$ is one, i. e., monohydric ether alcohols. Among these also the mono ethers of glycols, particularly those of ethylene glycol are preferred because of the ease with which these monohydric ether alcohols are prepared, their resulting low cost and high availability, and their effectiveness with cellulose organic ester compositions.

To the plastic or coating compositions illustrated by the above examples, it is at times desirable to add modifiers such as natural or synthetic resins, waxes, or oils and such modifications come within the scope of the present invention.

The compositions containing these new plasticizers may be used in the preparation of all types of compositions containing organic cellulose esters. In particular they may be used in the preparation of lacquers for coating metal, wood, fabric, in dopes for coating fabric, non-woven fibrous sheet material, e. g., paper, in plastic compositions for the use in the preparation of toiletware, novelties, sheeting, rods, tubes, safety glass interlayers, etc. They may also be used in the casting of thin transparent foils for wrapping purposes which may or may not be moistureproof, depending upon whether or not modifiers and waxes have been added. They may be used in the preparation of photographic film.

It is a matter of general recognition and therefore a problem that compositions containing esters of cellulose with organic acids and particularly cellulose acetate compositions are subject to serious disadvantages when compared with the more widely used cellulose nitrate compositions. Among these defects is the inherent brittleness of the compositions containing esters of cellulose with organic acids in general and cellulose acetate compositions in particular. The plasticizers of the present invention increase the toughness of compositions containing esters of cellulose with organic acid and particularly cellulose acetate, to an extent considerably beyond that of the more common acetate plasticizers such as dimethyl phthalate, dimethoxyethyl phthalate, triacetin, dibutyl tartrate, etc. The products have given satisfactory results in plastics when prepared by the regular plastics process, and in the casting of thin foils for wrapping as well as in dopes for coating fabrics and for cable lacquers, etc.

The levulinates of ether alcohols derived from higher alcohols also materially decrease the water sensitiveness of the cellulose organic ester compositions and particularly cellulose acetate compositions. This property of decreasing water sensitiveness becomes particularly marked with esters wherein the ether radical of the ether alcohol contains at least six carbon atoms in the case of a mono ether and at least four carbon atoms in the case of the ether alcohol containing a plurality of ether groups. These higher alcohol derivatives are water insoluble and therefore add materially to the water resistance of cellulose acetate films containing them and therefore form a prepared class of plasticizers.

The above description and examples are intended to be illustrative only. Any modification of or variation therefrom which conforms to the spirit of the invention is intended to be included within the scope of the claims.

1. A new composition of matter comprising a cellulose ester of an organic acid and, in plasticizing proportions, a levulinic acid ester of an ether alcohol.

2. A thin film of cellulose acetate plasticized with, in plasticizing proportions, a levulinate of an ether alcohol.

3. A new composition of matter comprising cellulose acetate and, in plasticizing proportions, a levulinic acid ester of an ether alcohol.

4. A new combination of matter comprising a cellulose ester of an organic acid and, in plasticizing proportions, a levulinic acid ester of a monohydric ether alcohol.

5. A new composition of matter comprising cellulose acetate and, in plasticizing proportions, a levulinate of a monohydric ether alcohol.

6. A new composition of matter comprising a cellulose ester of an organic acid and, in plasticizing proportions, a levulinic acid ester of a monohydric ether alcohol, said alcohol being of the formula $(RO)_yR'OH$ wherein R is alkyl, cycloalkyl, aryl or aralkyl, R' is a polyvalent aliphatic hydrocarbon radical, R' having a valence of $y+1$, $y$ being a positive number from one to four, and R containing at least six carbon atoms when $y$ is one and at least four carbon atoms when $y$ is more than one.

7. A new composition of matter comprising cellulose acetate and, in plasticizing proportions, a levulinic acid ester of a monohydric ether alcohol, said alcohol being of the formula $(RO)_yR'OH$ wherein R is alkyl, cycloalkyl, aryl or aralkyl, R is a polyvalent aliphatic hydrocarbon radical, R' having a valence of $y+1$, $y$ being a positive number from one to four, and R containing at least six carbon atoms when $y$ is one and at least four carbon atoms when $y$ is more than one.

8. A new composition of matter comprising an organic acid ester of cellulose and, in plasticizing proportions, a levulinic ester of a monoether of a glycol.

9. A new composition of matter comprising cellulose acetate and, in plasticizing proportions, a levulinic acid ester of a monoether of a glycol.

10. A new composition of matter comprising an organic acid ester of cellulose and, in plasticizing proportions, a levulinic acid ester of a monoether of ethylene glycol.

11. A new composition of matter comprising cellulose acetate and, in plasticizing proportions, a levulinic acid ester of a monoether of ethylene glycol.

12. A new composition of matter comprising an organic acid ester of cellulose and, in plasticizing proportions, a levulinic acid ester of a monoether of ethylene glycol, wherein the ether radical contains at least six carbon atoms.

13. A new composition of matter comprising cellulose acetate and, in plasticizing proportions, a levulinic acid ester of a monoether of ethylene glycol, wherein the ether radical contains at least six carbon atoms.

14. A new composition of matter comprising an organic acid ester of cellulose and, in plasticizing proportions, a levulinic acid ester of a monoether of a glycol, the ether radical thereof being derived from a branched chain monohydric alcohol of at least six carbon atoms derived from the catalytic hydrogenation of carbon monoxide.

15. A new composition of matter comprising cellulose acetate and, in plasticizing proportions, a levulinic acid ester of a monoether of a glycol, the ether radical thereof being derived from a branched chain monohydric alcohol of at least six carbon atoms derived from the catalytic hydrogenation of carbon monoxide.

16. A new composition of matter comprising an organic acid ester of cellulose and, in plasticizing proportions, a levulinic acid ester of a monoether of ethylene glycol, the ether radical thereof being derived from a branched chain monohydric alcohol of at least six carbon atoms derived from the catalytic hydrogenation of carbon monoxide.

17. A new composition of matter comprising cellulose acetate and, in plasticizing proportions, a levulinic acid ester of a monoether of ethylene glycol, the ether radical thereof being derived from a branched monohydric alcohol of at least six carbon atoms derived from the catalytic hydrogenation of carbon monoxide.

18. A new composition of matter comprising cellulose acetate, in plasticizing proportions, and 2-methylpentyloxyethyl levulinate.

19. A new composition of matter comprising cyclohexyloxyethyl levulinate.

20. A new composition of matter comprising a cellulose ester of an organic acid and, in plasticizing proportions, a levulinate of a polyhydric ether alcohol.

21. A new composition of matter comprising cellulose acetate and, in plasticizing proportions, a levulinate of a polyhydric ether alcohol.

22. A new composition of matter comprising cellulose acetate, in plasticizing proportions, and diethylene glycol dilevulinate.

23. A new composition of matter comprising a cellulose ester of an organic acid and 15 to 85 parts, per 100 parts of the cellulose ester, of a levulinic acid ester of an ether alcohol.

24. A thin film of cellulose acetate plasticized with 15 to 85 parts, per 100 parts of cellulose acetate, of a levulinate of an ether alcohol.

25. A new composition of matter comprising cellulose acetate and 15 to 85 parts, per 100 parts of cellulose acetate, of a levulinic acid ester of an ether alcohol.

EMMETTE F. IZARD.

CERTIFICATE OF CORRECTION.

Patent No. 2,041,715.                                            May 26, 1936.

EMMETTE F. IZARD.

It is hereby certified that error appears in the printed specification of the above numbered patent requiring correction as follows: Page 2, second column, line 53, claim 4, for "combination" read composition; page 3, second column, line 20, claim 19, after "comprising" insert the words cellulose acetate, in plasticizing proportions, and; and that the said Letters Patent should be read with these corrections therein that the same may conform to the record of the case in the Patent Office.

Signed and sealed this 1st day of September, A. D. 1936.

Leslie Frazer (Seal)                                              Acting Commissioner of Patents.